US012697003B2

(12) United States Patent
Mirra

(10) Patent No.: US 12,697,003 B2
(45) Date of Patent: Aug. 4, 2026

(54) WINDOW WASHING SYSTEMS AND METHODS

(71) Applicant: Mirraclear LLC, Hillsboro Beach, FL (US)

(72) Inventor: Shauna Mirra, Hillsboro Beach, FL (US)

(73) Assignee: Mirraclear LLC, Hillsboro Beach, FL (US)

( * ) Notice: Subject to any disclaimer, the term of this patent is extended or adjusted under 35 U.S.C. 154(b) by 688 days.

(21) Appl. No.: 18/045,659

(22) Filed: Oct. 11, 2022

(65) Prior Publication Data

US 2023/0116013 A1 Apr. 13, 2023

Related U.S. Application Data

(60) Provisional application No. 63/255,204, filed on Oct. 13, 2021.

(51) Int. Cl.
*A47L 1/02* (2006.01)
*B08B 3/02* (2006.01)

(52) U.S. Cl.
CPC ................ *A47L 1/02* (2013.01); *B08B 3/024* (2013.01)

(58) Field of Classification Search
CPC ... A47L 1/02; B08B 3/02; B08B 3/024; F24S 40/20; H02S 40/10; H02S 40/12
See application file for complete search history.

(56) References Cited

U.S. PATENT DOCUMENTS 10,550,591 B2 * 2/2020 Lange ................. A47L 11/4088

FOREIGN PATENT DOCUMENTS

| | | | | | |
|---|---|---|---|---|---|
| CN | 111359921 A | * | 7/2020 | | B08B 13/00 |
| CN | 112545353 A | * | 3/2021 | | A47L 1/02 |
| CN | 113131855 A | * | 7/2021 | | H02S 40/10 |
| RU | 147117 U1 | | 10/2014 | | |
| RU | 2755731 C1 | * | 9/2021 | | A47L 1/02 |

* cited by examiner

*Primary Examiner* — Shay Karls
(74) *Attorney, Agent, or Firm* — Foley Hoag LLP; David P. Halstead; Stephen J. Kenny

(57) ABSTRACT

A window washing assembly includes a first roller bar and a second roller bar affixed within a window frame. The assembly includes a first pulley coupled to the first roller bar and the second roller bar. The assembly includes a second pulley parallel to the first pulley and coupled to the first roller bar and the second roller bar. The assembly includes a wiper arm coupled to the first pulley and the second pulley, wherein the wiper arm includes at least one spray nozzle, a wiper blade, and at least one magnet. The assembly includes a motor coupled to the first or second roller bar. The assembly includes a first magnetic stop and a second magnetic stop. The assembly includes a cleaning fluid reservoir fluidly coupled to the one or more spray nozzles of the wiper arm.

17 Claims, 16 Drawing Sheets

WINDOW WASHING SYSTEMS AND METHODS

CROSS REFERENCE TO RELATED APPLICATIONS

This application claims the benefit of priority under 35 USC 119(e) to U.S. Provisional Patent App. No. 63/255,204, filed on Oct. 13, 2021, the entirety of which is incorporated by reference herein.

FIELD OF THE INVENTION

Embodiments of the present disclosure generally relate to window washing systems for cleaning the exterior of a window of a building (e.g., residential or commercial).

BACKGROUND

Cleaning the external-facing side of windows in residential and commercial settings can be a difficult, labor-intensive task that is also dangerous when working on windows that are at elevated heights. Window washing is generally performed as a manual task regardless of the height of the building and reaching each window of a building may require a ladder or other device (a Bosun's chair) suspended by ropes or cables from the roof of the building to help a window washer reach and manually wash the window.

Window washing systems of the prior art are generally bulky, with some including entirely separate, large carts that house the motor, pump, and other control equipment. Other window washing systems spray cleaning solution from a fixed position at the top of the window. However, this method does not evenly apply the cleaning solution to the entire window, resulting in missed spots and an unevenly cleaned surface when a wiper blade or sponge finally wipes the fluid away.

Accordingly, there is a need for an automated window washing system for cleaning an external surface of a window pane that has a low-profile (e.g., is hidden) as well as effectively and evenly cleans the window pane surface.

BRIEF SUMMARY

In various embodiments, a window washing assembly includes a first roller bar affixed within a first side of a window frame that is surrounding a window pane. The assembly further includes a second roller bar affixed within a second side of the window frame. The assembly further includes a first pulley disposed within a third side of the window frame where the first pulley is coupled to the first roller bar and the second roller bar. The assembly further includes a second pulley parallel to the first pulley and disposed within a fourth side of the window frame where the second pulley coupled to the first roller bar and the second roller bar. The assembly further includes a wiper arm extending from a first end to a second end and having a length therebetween. The first end of the wiper arm is coupled to the first pulley and the second end of the wiper arm is coupled to the second pulley. The wiper arm includes at least one spray nozzle disposed along the length. The assembly further includes a wiper blade in contact with the window pane and at least one magnet affixed to the wiper arm. The assembly further includes a motor rotatably coupled to the first roller bar or the second roller bar such that, upon activation, the motor rotates the first roller bar and the second roller bar thereby causing the wiper arm to translate in a direction parallel with the window. The assembly further includes a first magnetic stop disposed between a first edge of the window pane and the first roller bar. The assembly further includes a second magnetic stop disposed between a second edge of the window pane and the second roller bar. The assembly further includes a cleaning fluid reservoir fluidly coupled to the one or more spray nozzles of the wiper arm. A distance between the first magnetic stop and the second magnetic stop defines a translation distance of the wiper arm and, when the one or more magnet of the wiper arm contacts the first magnetic stop or the second magnetic stop, the motor is configured to stop and/or reverse translation of the wiper arm.

A window washing assembly includes an assembly frame having a first side, a second side opposite the first side, a third side adjacent to the first side and the second side, and a fourth side adjacent to the first side and the second side. The fourth side is opposite the third side. The assembly further includes a first roller bar affixed along the first side of the frame. The assembly further includes a second roller bar affixed along the second side of the frame. The assembly further includes a first pulley disposed along the third side of the frame where the first pulley is coupled to the first roller bar and the second roller bar. The assembly further includes a second pulley parallel to the first pulley and disposed along the fourth side of the frame where the second pulley coupled to the first roller bar and the second roller bar. The assembly further includes a wiper arm extending from a first end to a second end and having a length therebetween. The first end of the wiper arm is coupled to the first pulley and the second end of the wiper arm is coupled to the second pulley. The wiper arm includes a wiper blade. The assembly further includes a motor rotatably coupled to the first roller bar or the second roller bar such that, upon activation, the motor rotates the first roller bar and the second roller bar thereby causing the wiper arm to translate in a direction parallel with the third side and the fourth side. The assembly further includes a first plurality of spray nozzles disposed along the third side of the frame, a second plurality of nozzles disposed along the fourth side of the frame, and a cleaning fluid reservoir fluidly coupled to the first plurality of spray nozzles and the second plurality of spray nozzles.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

Reference will now be made in detail to exemplary embodiments of the disclosed subject matter, an example of which is illustrated in the accompanying drawings. The method and corresponding steps of the disclosed subject matter will be described in conjunction with the detailed description of the system.

The present invention concerns that of a new and improved apparatus for use with windows on buildings. The apparatus would be an electronic system for automatically cleaning the exterior side of windows in buildings, preferably skyscrapers, which would be operated through a control panel located inside a room within the building. Each system would be specifically designed for only one window.

Figure 1:
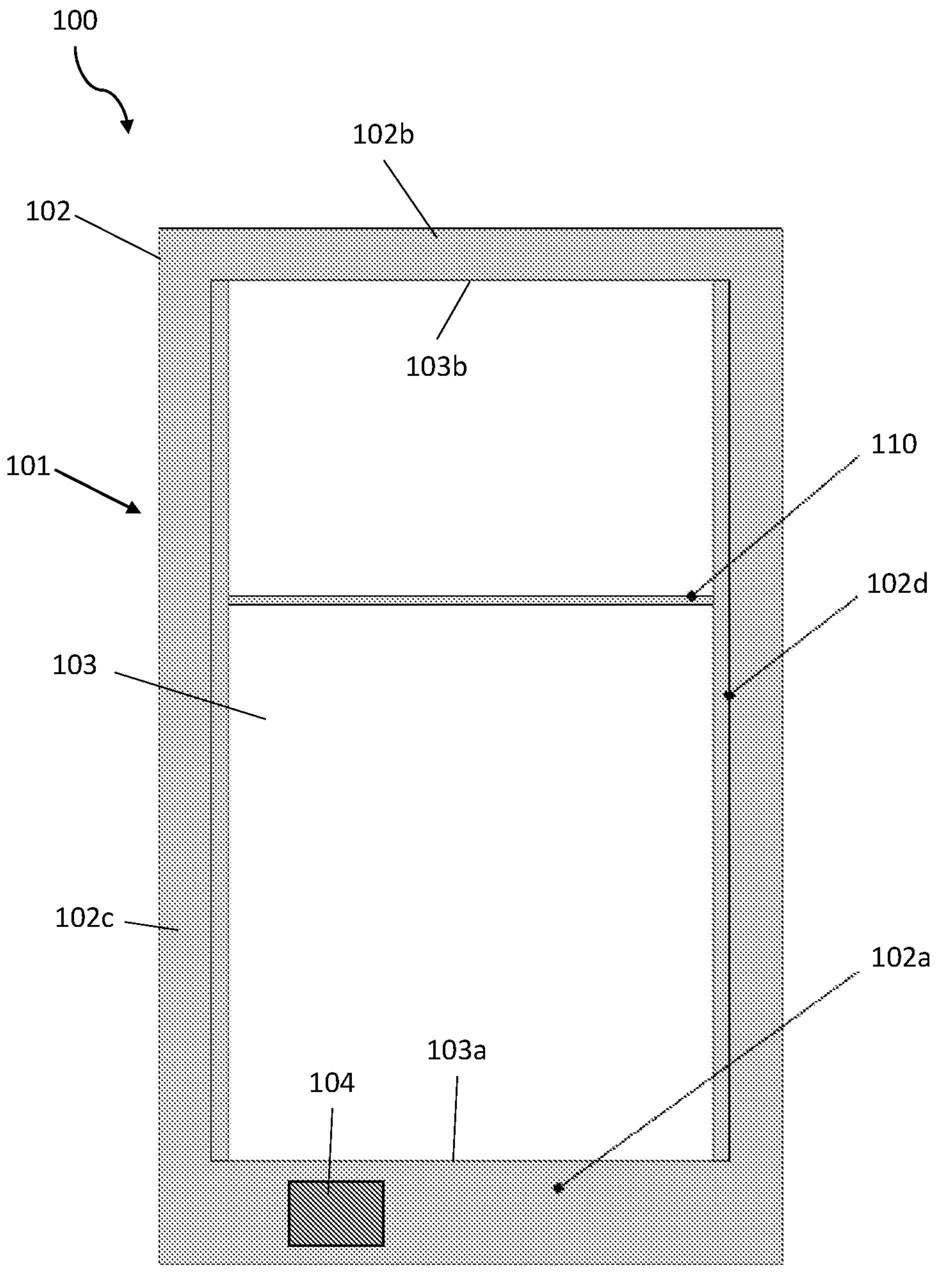
FIG. 1 illustrates a window having a window washing assembly in accordance with an embodiment of the present disclosure.
Figure 2:
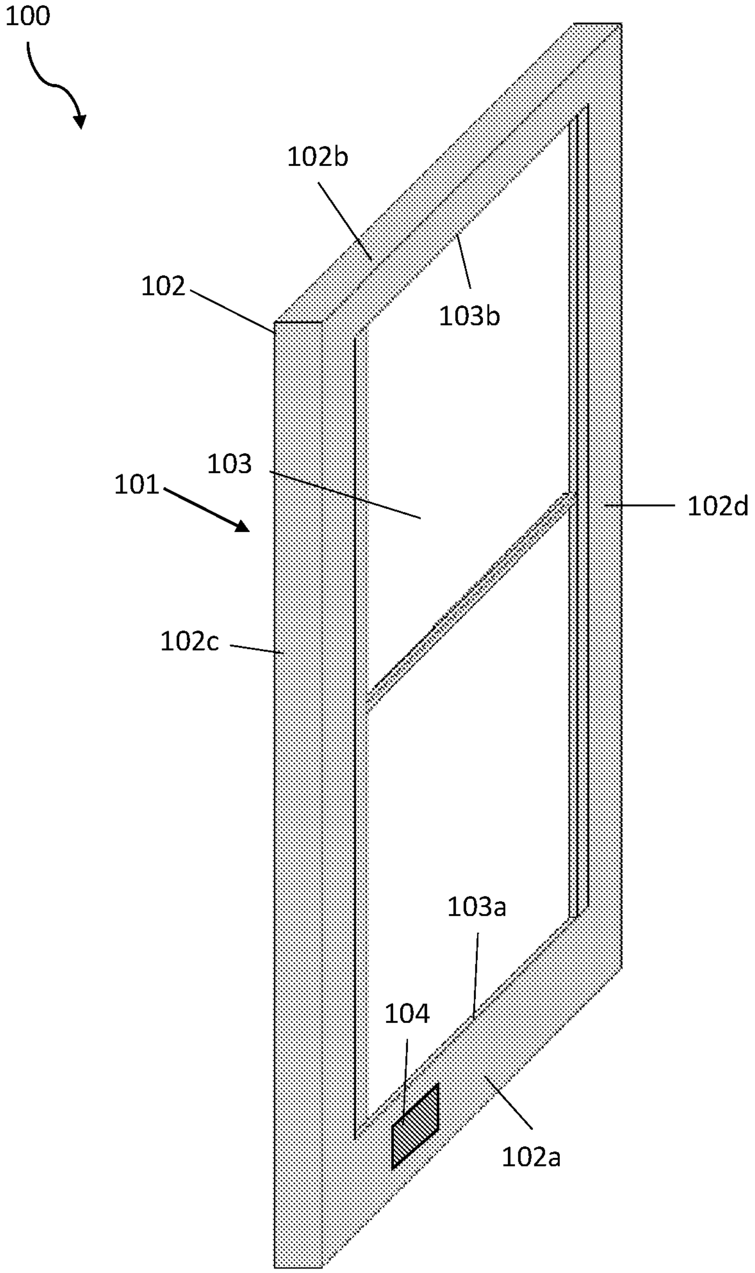
FIG. 2 illustrates a perspective view of a window having a window washing assembly in accordance with an embodiment of the present disclosure.

FIG. 1 illustrates a window having a window washing assembly 100 and FIG. 2 illustrates a perspective view of a window having a window washing assembly. In particular, FIG. 1 illustrates an indoor-out view of a window having a window washing system attached to the exterior. The window 101 includes a window frame 102 surrounding a window pane 103. In various embodiments, the window pane 103 may include a first edge 103*a* (e.g., a bottom edge) and a second edge 103*b* (e.g., a top edge). In various embodiments, the window 101 may be any standard window shape (e.g., single-hung, double-hung, arch, awning, bay, bow, casement, hopper, Jalousie, picture, custom, etc.). In various embodiments, the window is rectangular in shape. In various embodiments, the window frame 102 includes a first side 102*a*, a second side 102*b*, a third side 102*c*, and a fourth side 102*d*. In various embodiments, the first side 102*a* may correspond to the bottom of the window 101. In various embodiments, the second side 102*b* may correspond to the top of the window 101. In various embodiments, the third side 102*c* may correspond to the left side of the window 101. In various embodiments, the fourth side 102*d* may correspond to the right side of the window 101. In various embodiments, the window 101 may not be rectangular and may include any suitable number of sides as is known in the art.

In various embodiments, a motor and/or one or more control modules may be housed on the first side 102*a* of the window frame 101. In other embodiments, the motor and/or control modules may be positioned on any suitable side, 102*a*, 102*b*, 102*c*, 102*d* of the window frame 101. In various embodiments, the window washing assembly may include a wiper arm 110 that extends along the length of the window pane 103. In various embodiments, the window washing assembly may include a track configured to retain the wiper arm and allow the wiper arm to translate along the window pane 103. In various embodiments, the track may be integrated into the sides 102*c*, 102*d* of the window frame 102. In various embodiments, the window 101 may include an access panel 104 disposed on an interior surface. In various embodiments, the access panel 104 may be configured to access the motor and/or control unit components, which may, for example, be positioned on the exterior surface of the window frame 102.

In various embodiments, the wiper arm may begin at the bottom edge of the window pane 103. In various embodiments, upon energizing the motor, the wiper arm may translate upwards from the first edge 103*a* of the window pane 103 to the second edge 103*b* of the window pane 103. In various embodiments, the wiper arm includes one or more (e.g., a plurality of) spray nozzles configured to provide (e.g., spray) a cleaning fluid on the window pane 103. In various embodiments, each side 102*c*, 102*d* includes one or more spray nozzles configured to provide (e.g., spray) a cleaning fluid on the window pane 103. In various embodiments, other sides 102*a*, 102*b* may include spray nozzles configured to provide (e.g., spray) a cleaning fluid on the window pane 103. In various embodiments, while translating upwards, the wiper arm may be configure to spray a cleaning solution on the window pane 103. In various embodiments, prior to the wiper arm translating, the cleaning fluid may be sprayed onto the window pane 103. In various embodiments, the window washing assembly includes a cleaning fluid reservoir. In various embodiments, the window washing assembly 100 may further include a pump for pumping cleaning fluid from the cleaning fluid reservoir to the one or more nozzles.

In various embodiments, when the wiper arm reaches the second edge 103*b* of the window pane 103, one or more magnet on the wiper arm will activate an upper relay (e.g., a magnetic stop) at the second edge 103*b*, to thereby stop the motor and stop the spraying of cleaning fluid. In various embodiments, the control module may then activate the motor to reverse direction and push the wiper arm down the glass thereby wiping away any fluid on the surface of the window pane 103. In various embodiments, when the wiper arm reaches the first edge 103*a* of the window pane 103, the one or more magnet on the wiper arm may activate a lower relay (e.g., a magnetic stop), to thereby stop the motor. In various embodiments, the process may repeat one or more times. In various embodiments, the system may stop and await a future command, for example, from a user-controlled mobile application.

In various embodiments, the window washing system may be configured as an internet-of-things (IOT) device. In various embodiments, the window washing system may be operable via a smart phone application to control window washing of an individual or preset number of windows. In various embodiments, the application may provide for intelligent control of the window washing process. For example, a user may set the window washing process to start at a particular location (e.g., all windows on a highest story) and proceed down each story after the windows on the upper story(ies) have finished the window washing process. In various embodiments, a user may schedule automated cleanings via the mobile application so that one or more windows are cleaned at a predetermined time and for a predetermined number of windows (e.g., all windows of a single building). For example, a user may schedule window cleanings to occur weekly on Sundays at 8 am, beginning with the top-most windows and ending with the ground-level windows.

In various embodiments, components of the window washing system (e.g., track, pulleys, etc.) may be hidden within the window frame. In various embodiments, components of the window washing system may be housed within a housing. For example, the entire pulley system (gears, chains, etc.) can be enclosed to shelter from inclement weather conditions. In various embodiments, the housing may include similar colors and/or textures as the window frame and/or building to make the window washing system profile as discreet as possible. In various embodiments, the system may include a gasket or seal (e.g., weather stripping) configured to hide one or more parts of the system. For example, the side tracks may include polymer (e.g., nylon) bristles configured to hide the side tracks but allow the wiper arm to translate up and down.

In various embodiments, a window washing system may include a central cleaning fluid reservoir fluidly coupled to two or more window washing assemblies on a single building. In various embodiments, the central cleaning fluid reservoir may supply all window units with window washing fluid.

In various embodiments, a window washing system may include a central power supply configured to supply power to all window washing assemblies in a single building.

Figure 3A:
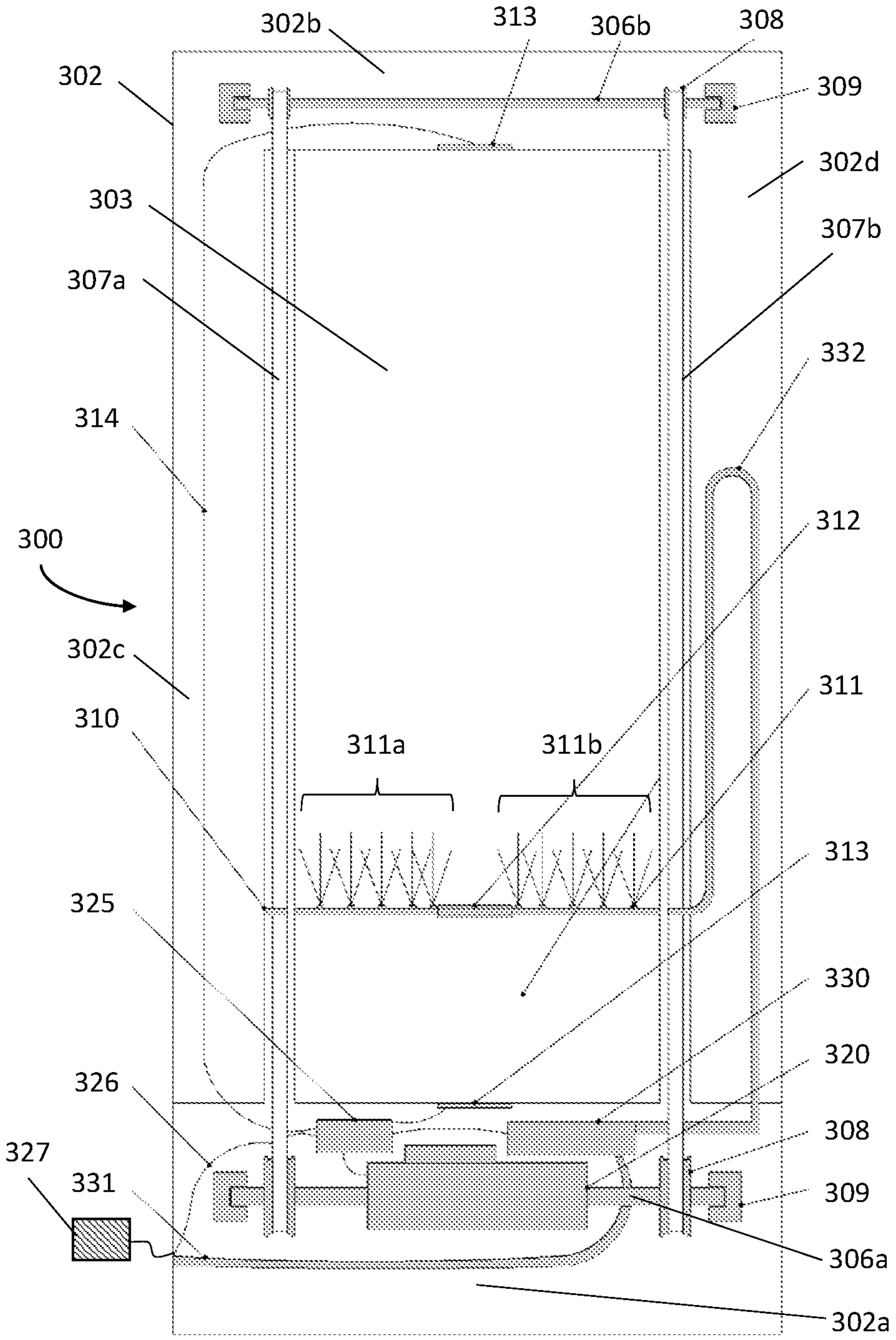
FIG. 3A illustrates an exterior view of a window having an integrated window washing assembly in accordance with an embodiment of the present disclosure.
Figure 3B:
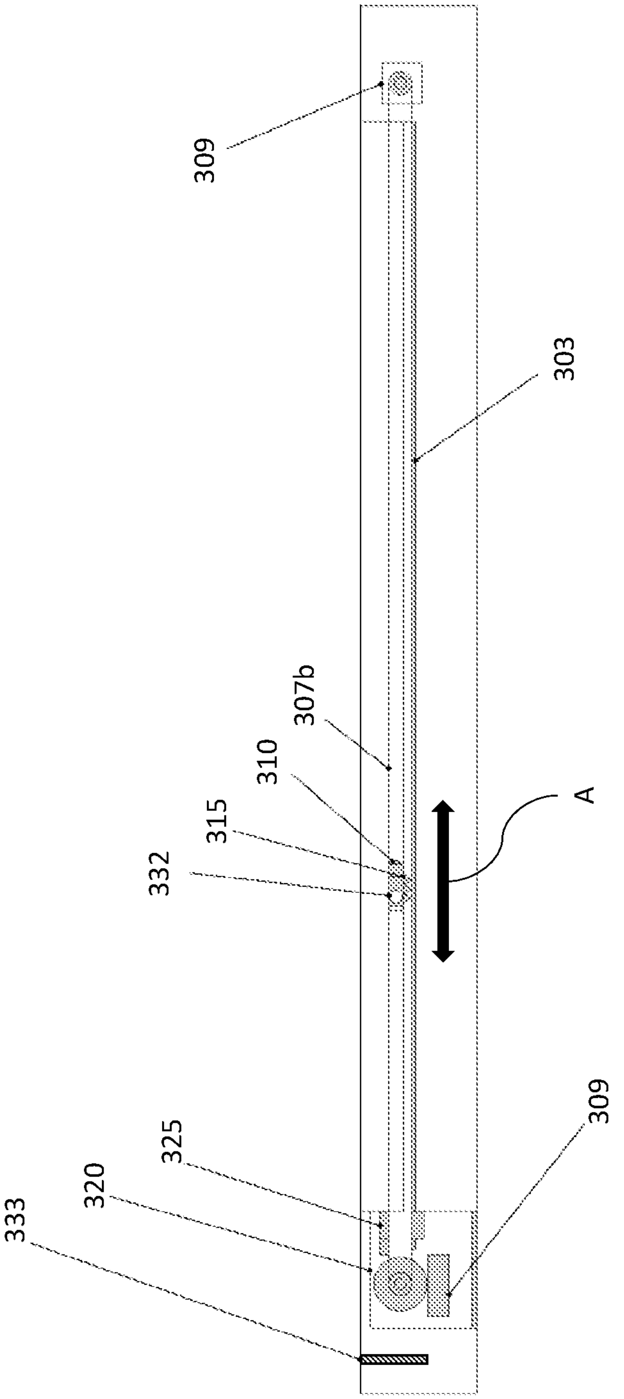
FIG. 3B illustrates a side view of a window having an integrated window washing assembly in accordance with an embodiment of the present disclosure.

FIG. 3A illustrates an exterior view of a window having an integrated window washing assembly 300 and FIG. 3B illustrates a side view of the integrated window washing assembly 300. As shown in FIGS. 3A-3B, the window washing assembly 300 includes a first roller bar 306*a* disposed at a first side 302*a* of the window frame 302 and a second roller bar 306*b* disposed at a second side 302*b* of the window frame 302. A first pulley 307*a* is disposed along the third side 302*c* of the window frame 302 and coupled to the first roller bar 306*a* and the second roller bar 306*b*. A second pulley 307*b* is disposed along the fourth side 302*d* of the window frame 302 and coupled to the first roller bar 306*a* and the second roller bar 306*b*. As shown in FIG. 3A, the first pulley 307*a* and the second pulley 307*b* are parallel to one another. In various embodiments, the first pulley 307*a* and the second pulley 307*b* may be hidden within the window frame 302. In various embodiments, each pulley 307*a* and 307*b* may be coupled to the roller bars 306*a*, 306*b* via a pulley wheel 308. In various embodiments, the roller bars 306*a*, 306*b* may be coupled to the window frame 302 via one or more bearing 309 (e.g., ball bearing, fluid bearing, magnetic bearing, etc.). As shown in FIGS. 3A-3B, the wiper arm 310 translates up and down (and/or down and up) along the window pane.

In various embodiments, rather than a pulley, the window washing assembly may include any suitable mechanism that converts rotational motion from a motor into linear motion capable of translating the wiper arm 310. In various embodiments, each end of the wiper arm 310 may be coupled to a linear screw actuator (also called a linear slide). In various embodiments, a screw (e.g., acme screw) of the linear slide may receive the rotation from the motor and convert the rotational motion into translational motion where the wiper arm is coupled to a carriage plate of the linear screw actuator. In various embodiments, the wiper arm 310 may be coupled to one or more linear screw actuator. In various embodiments, each end of the wiper arm 310 may be disposed inside a belt that wraps around the pulleys (e.g., the belt may be integrally formed around the ends of the wiper arm 310 or each end of wiper arm 310 may be inserted into a pocket within the belt). In various embodiments, the belt may be designed to accept the wiper arm inside of it with some room to rotate slightly allowing an angle against the window pane. In various embodiments, to accommodate a hose to supply the nozzles with cleaning fluid, the wiper arm 310 may include an integrated fitting configured to hold the wiper arm in place against the respective belt and allow attachment of the cleaning solution hose. In various embodiments, where the wiper arm 310 translates sideways (left-to-right or right-to-left, where the wiper arm extends from a top side of the window frame to a bottom side of the window frame), the hose that supplies the cleaning fluid may be coupled to the wiper arm 310 at the top side.

In various embodiments, a motor 320 may be operably coupled to at least one of the roller bars 306*a*, 306*b*. As shown in FIGS. 3A-3B, the motor 320 is operably coupled to the first roller bar 306*a* and is configured to drive the first roller bar 306*a* to thereby translate the wiper arm 310 up and down the window pane 303. In various embodiments, the motor 320 may be a stepper motor. In various embodiments, the motor 320 may be a brushless motor. In various embodiments, the motor 320 may be a DC motor. In various embodiments, the motor 320 may be an AC motor. In various embodiments, the motor 320 may be electrically coupled to a controller 325 configured to provide control signals to the motor 320. In various embodiments, the controller 325 may receive power (e.g., 120V AC, 12V DC, 3V DC, etc.) via a power cable 326 from a power source 327 (e.g., a 120V AC electrical outlet). In various embodiments, the motor 320 may be reversible in direction of rotation (e.g., by inverting the polarity of the applied voltage in a DC motor).

As shown in FIGS. 3A-3B, the washer assembly further includes a wiper arm 310 extending between and coupled to the first pulley 307*a* and the second pulley 307*b*. In various embodiments, one or more spray nozzles 311 (e.g., a plurality of nozzles) may be disposed along the length of the wiper arm 310. In various embodiments, the one or more spray nozzles 311 may be equally-spaced along the length of the wiper arm 310. In various embodiments, the nozzles 311 may be oriented directly perpendicularly towards the surface of the window pane 303. In various embodiments, the nozzles 311 may be directed at an angle to the surface of the window pane 303. In various embodiments, the nozzles may be directed at differing angles. For example, the nozzles may alternate between 30° and −30° from an axis perpendicular to the surface of the window pane 303. One skilled in the art will understand that the nozzles may be oriented at any suitable angle to provide better (e.g., more evenly spread) coverage of cleaning fluid on the surface of the window pane 303.

In various embodiments, the wiper arm 310 includes one or more magnets 312. In various embodiments, the one or more magnets 312 may be positioned at a center of the wiper arm along its length. In various embodiments, the one or more magnets 312 may be positioned in any suitable location along the length of the wiper arm 310 such that the one or more magnets 312 can engage a corresponding magnetic stop 313 at the edges of the window pane (the distance therebetween defining a linear travel distance of the wiper arm 310). In various embodiments, each magnetic stop 313 may be electrically coupled to the controller 325 to thereby provide a control signal to the controller 325 for stopping and/or reversing the direction of the wiper arm 310. In various embodiments, the one or more nozzles 311 may include a first subset of nozzles 311*a* positioned on one side (e.g., left side) of the one or more magnets 312 and a second subset of nozzles 311*b* on the other side (e.g., right side) of the one or more magnets 312. In general, locating the spray nozzles on the wiper arm may deliver the best results as the entire window surface can be coated during the cleaning process. Spraying from the top only may cause streaks as the wiper arm would lose solution the further it travels. In various embodiments, spraying from the side may also be suitable as long as side nozzles are configured (e.g., adjusted to spray at different angles) to cover the entire window. Additionally, the nozzles 311 may be equipped to spray liquid (e.g. water and/or cleansing solution) as well as air to facilitate streak-free drying of the window pane. In some embodiments, a refillable canister of compressed air can be housed within the wiper arm to supply pressurized air to the nozzle orifices. The nozzles can dispense pressurized air in a pulsed or continuous fashion. Also, the nozzles orientation or direction can be adjusted during the dispensing of an air jet to provide a vector or column of air the forcefully remove any water (or debris) that may be present on the window.

In various embodiments, a protrusion may be provided on the wiper arm 310 such that the protrusion activates a switch (e.g., a button) or completes a circuit (e.g., via contact between two metal ends) to provide a signal to a controller via relay wire 314 and thereby stop the linear travel of the wiper arm 310 and/or reverse the linear direction of travel of the wiper arm 310. In various embodiments, an infrared distance sensor may be used to determine when the wiper arm is nearing the edge of the window pane 303 to provide a control signal to the control unit and thereby stop and/or reverse the direction of travel of the wiper arm 310. In various embodiments, the wiper arm may include one or more (e.g., two) stop points at which the wiper arm stops and reverses direction when contacted. In various embodiments, this may be achieved by programming in the central processing unit that counts revolutions of the pulley, a timed interval, and/or rotations of a motor. In various embodiments, an advantage of the magnetic stops is that stops can be used to adjust for changes in the cycle of the wiper arm. In various embodiments, if the wiper arm is out of calibration (e.g., translates too far or not enough), the system can correct itself by running through a cycle and finding the stop and start points denoted by the magnetic stops. In various embodiments, without a stop to define stopping points of the wiper arm, if the wiper arm were to lose calibration, the system may require manual service.

As shown in FIG. 3A, the window washing assembly 300 further includes a cleaning fluid relay 330. In various embodiments, the cleaning fluid relay 330 includes a fluidic switch configured to turn on and off a pump (e.g., when cleaning fluid is supplied from a centralized reservoir). In various embodiments, the cleaning fluid relay 330 include one or more fluidic valves configured to control the supply of cleaning fluid In various embodiments, the cleaning fluid relay 330 may include a cleaning fluid supply line 331 configured to deliver cleaning fluid to the cleaning fluid relay 330. In various embodiments, the cleaning fluid supply line 331 may include any suitable material for delivering a cleaning fluid. For example, the cleaning fluid supply line 331 may be made of nylon, vinyl, polyurethane, and/or polyethylene. The cleaning fluid relay 330 may deliver the cleaning fluid to the spray nozzles 311 via a nozzle supply line 332. In various embodiments, the nozzle supply line 332 may include a flexible material. In various embodiments, the nozzle supply line 332 may include a no-kink tube. In various embodiments, the nozzle supply line 332 may include any suitable material for delivering a cleaning fluid to the nozzles 311. For example, the nozzle supply line 332 may be made of nylon, vinyl, polyurethane, and/or polyethylene.

In various embodiments, the cleaning fluid relay 330 may be electrically coupled to the controller 325 and receive control signals from the controller 325. In various embodiments, the cleaning fluid relay 330 may adjust a flow rate of the cleaning fluid based on control signals received from the controller 325. For example, the controller 325 may instruct the pump to begin pumping cleaning fluid to the one or more nozzles 311 on the wiper arm 310. In various embodiments, the cleaning fluid relay 330 may track cleaning fluid levels and provide fluid level updates to the controller, which may then be provided to a server running a mobile application so that a user can access their window cleaning system status and view cleaning fluid levels. In various embodiments, the mobile application may provide a user an alert when cleaning fluid levels are low (e.g., enough fluid for one more cleaning operation).

In various embodiments, as shown in FIG. 3B, the window cleaning assembly 300 may include one or more weep holes 333 configured to allow any moisture to be evaporated from the assembly 300. In various embodiments, the wiper arm 310 includes one or more wiper blades 315 in contact with the exterior surface of the window pane 303. In various embodiments, the one or more wiper blades 315 are configured to translate in both directions along the surface of the window pane 303, as indicated by arrow A. The wiper blades can be replaceable (e.g., a removable squeegee/lip portion can be detached from the (permanent) wiper arm with an eye or J-hook similar to an automobile wiper blade). In various embodiments, each pulley 307*a*, 307*b* may be positioned within a containment track that is built into the window, thereby hiding the pulley within the window frame 302. In various embodiments, the wiper arm may engage (e.g., contact) the window pane through a portion of the belt cycle and not engage the window pane on another portion of the belt cycle. For example, the wiper arm may travel in a loop pointing outwards away from the window during the up cycle and then rotating around the pulley and engaging the window pane on the down cycle. In various embodiments, the connecting hose may include a joint configured to revolve 360 degrees (e.g., a rotary or swivel joint). In various embodiments, a stop sensor may be positioned along the path of the wiper blade to provide a signal to the control unit that stops the motor. In various embodiments, a tensioning device may be coupled to the pulley and activate on the one part of the cycle (e.g., upward cycle) and push the wiper arm assembly off of the glass (e.g., as the wiper arm travels upwards).

Figure 4A:
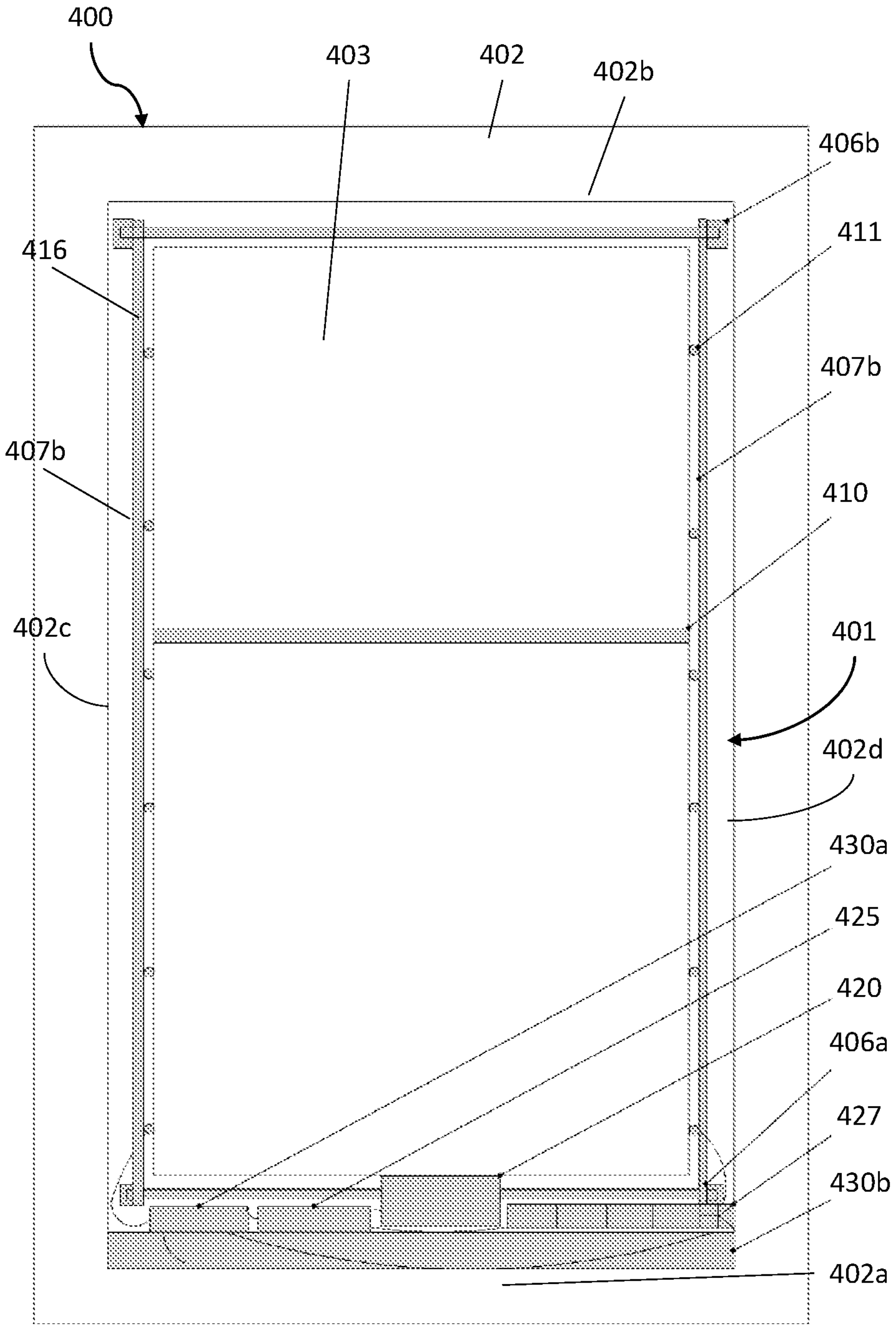
FIG. 4A illustrates an exterior view of a window having a removable window washing assembly attached thereto in accordance with an embodiment of the present disclosure.

FIG. 4A illustrates an exterior view of a window having a removable window washing assembly attached thereto. In various embodiments, the removable window washing assembly 400 includes a frame 416 mountable on an existing window 401 having a window frame 402 and a window pane 403. In various embodiments, the removable window washing assembly may be attached to an existing window frame via a fixation mechanism (e.g., screws, nails, rivets, nuts & bolts, etc.). In various embodiments, the window washing assembly may include one or more mounting holes integrated into the back frame configured to anchor to the window frame with the fixation mechanism(s). Similar to FIGS. 3A-3B, the removable window washing assembly 400 includes a first roller bar 406*a* disposed at a first side 402*a* of the window frame 402 and a second roller bar 406*b* disposed at a second side 402*b* of the window frame 402. A first pulley 407*a* is disposed along the third side 402*c* of the window frame 302 and coupled to the first roller bar 406*a* and the second roller bar 406*b*. A second pulley 407*b* is disposed along the fourth side 302*d* of the window frame 302 and coupled to the first roller bar 306*a* and the second roller bar 406*b*. As shown in FIG. 4A, the first pulley 407*a* and the second pulley 407*b* are parallel to one another. In various embodiments, the first pulley 407*a* and the second pulley 407*b* may be hidden within the window frame 402. In various embodiments, each pulley 407*a* and 407*b* may be coupled to the roller bars 406*a*, 406*b* via a pulley wheel. In various embodiments, the roller bars 406*a*, 406*b* may be coupled to the window frame 402 via one or more bearing (e.g., ball bearing, fluid bearing, magnetic bearing, etc.). In various, the removable system may include pulleys on the top and bottom to guide a cable or belt (e.g., rope, tread, wire, etc.) coupled to the wiper arm, similar to FIGS. 3A-3B. In various embodiments, each track may include one or more adjustment pulley to provide a taut coupling between pulleys and to allow for maintenance and/or repair of the system.

In various embodiments, similar to FIGS. 3A-3B, the removable window washing assembly 400 further includes a wiper arm 410 extending between and coupled to the first pulley 407*a* and the second pulley 407*b*.

In various embodiments, the removable window washing assembly 400 includes one or more spray nozzles 411 (e.g., a plurality of nozzles) disposed along the length of one or more sides 402*a*-402*d* of the frame (e.g., both vertical sides 402*c*, 402*d*). In various embodiments, the one or more spray nozzles 411 may be equally-spaced along the length of each side 402*a*-402*d*. In various embodiments, the one or more spray nozzles 411 may be unevenly-spaced along the length of each side 402*a*-402*d*. For example, the one or more spray nozzles 411 may be closer together towards the top side 402*b* and have greater spacing towards the bottom side 402*a*.

Figure 4B:
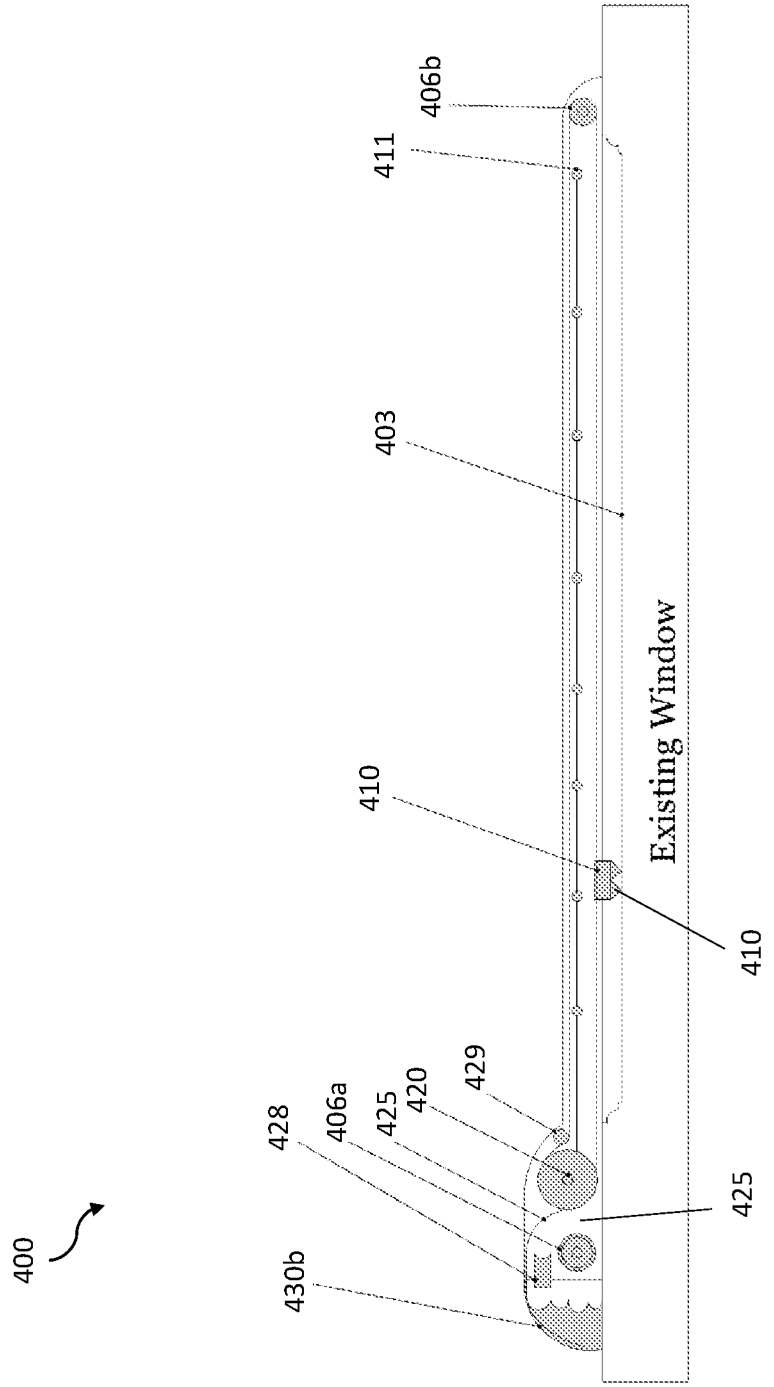
FIG. 4B illustrates a side view of a window having a removable window washing assembly attached thereto in accordance with an embodiment of the present disclosure.

In various embodiments, similar to FIGS. 3A-3B, the removable window washing assembly 400 includes a motor 420 operably coupled to at least one of the roller bars 406*a*, 406*b*. In various embodiments, as shown in FIGS. 4A-4B, the motor 420 is operably coupled to the first roller bar 406*a* and is configured to drive the first roller bar 406*a* to thereby translate the wiper arm 410 up and down the window pane 403. In various embodiments, the motor 420 may be electrically coupled to a controller 425 configured to provide control signals to the motor 420. In various embodiments, the controller 425 may receive power (e.g., 120V AC, 12V DC, 3V DC, etc.) via a power source 427 (e.g., a 120V AC electrical outlet). In various embodiments, the motor 420 may be reversible in direction of rotation (e.g., by inverting the polarity of the applied voltage in a DC motor).

In various embodiments, similar to FIGS. 3A-3B, the removable window washing assembly 400 further includes a cleaning fluid pump 430*a* and cleaning fluid reservoir 430*b*. In various embodiments, the removable window washing assembly 400 includes a nozzle supply line from the pump 430*a* (which draws fluid form the cleaning fluid reservoir 430*b* when energized) to each nozzle 411 in the sides 402*c*, 402*d* of the window frame 402.

In various embodiments, the pump 430*a* may be electrically coupled to the controller 425 and receive control signals from the controller 425. In various embodiments, the pump 430*a* may adjust a flow rate of the cleaning fluid based on control signals received from the controller 425. For example, the controller 425 may instruct the pump to begin pumping cleaning fluid to the one or more nozzles 411.

FIG. 4B illustrates a side view of a window having a removable window washing assembly 400 attached thereto. As shown in FIG. 4B, the removable window washing assembly 400 further includes a port 428 for providing window cleaning fluid into the cleaning fluid reservoir 430*b*. In various embodiments, the removable window washing assembly further includes an adjustment pulley 429 on each pulley 407*a*, 407*b* configured to adjust tension on the respective pulley 407*a*, 407*b*. In various embodiments, the adjustment pulley may be adjusted via, for example, a screw that is configured to add (e.g., via tightening the screw) or release (e.g., via loosening the screw) tension on the pulley 407*a*, 407*b*.

In some embodiments the window cleaning system disclosed herein can include a heating element to preheat the cleaning fluid, and or de-ice the nozzles. For example, the reservoir of cleaning fluid can include an electrical conductor (e.g., copper wire) circumscribing the reservoir to elevate the temperature of the cleaning fluid contained there prior to dispensing from the nozzles on the wiper arm. Additionally or alternatively, the nozzles can include thermally conductive elements to deliver heat directly to the nozzle structure, thereby ensuring ice does not occlude the nozzle.

Furthermore, in some embodiments the wiper arm does not contact the window directly; instead the cleaning fluid ejected from the nozzles is the only material that directly engages the window pane. In some embodiments, the wiper arm can include a protruding (and flexible) lip which serves as a squeegee to engage the window pane and direct the cleaning fluid (and debris) off/down the window pane and into a collection reservoir.

Additionally, the nozzles can dispense cleaning fluid under constant pressure and/or temperature for the duration of the spray period. Alternatively, the nozzles can dispense cleaning fluid in a pulsed manner, with each nozzle operating at differing pressure/temperature. Furthermore, each nozzle can articulate over a range of motion (e.g., 180° with respect to a vertical axis, and 180° with respect to a horizontal axis) to vector the dispensed cleaning fluid to a particular target/location (e.g., where debris is known to be present on the window pane).

Figure 5B:
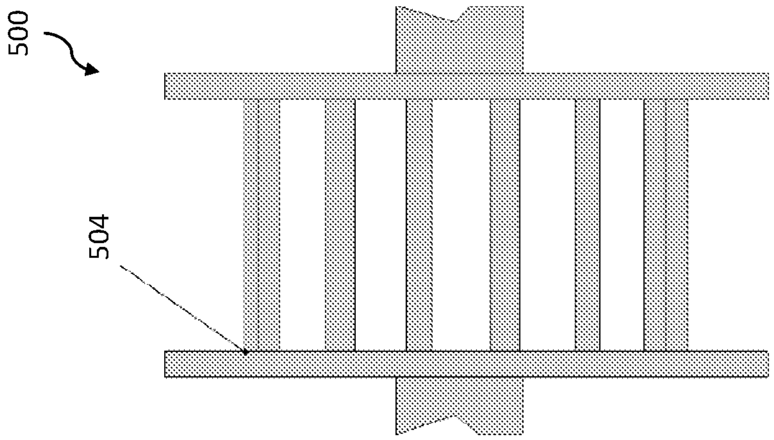
FIGS. 5A-5B illustrate a pulley in accordance with an embodiment of the present disclosure.
Figure 5A:
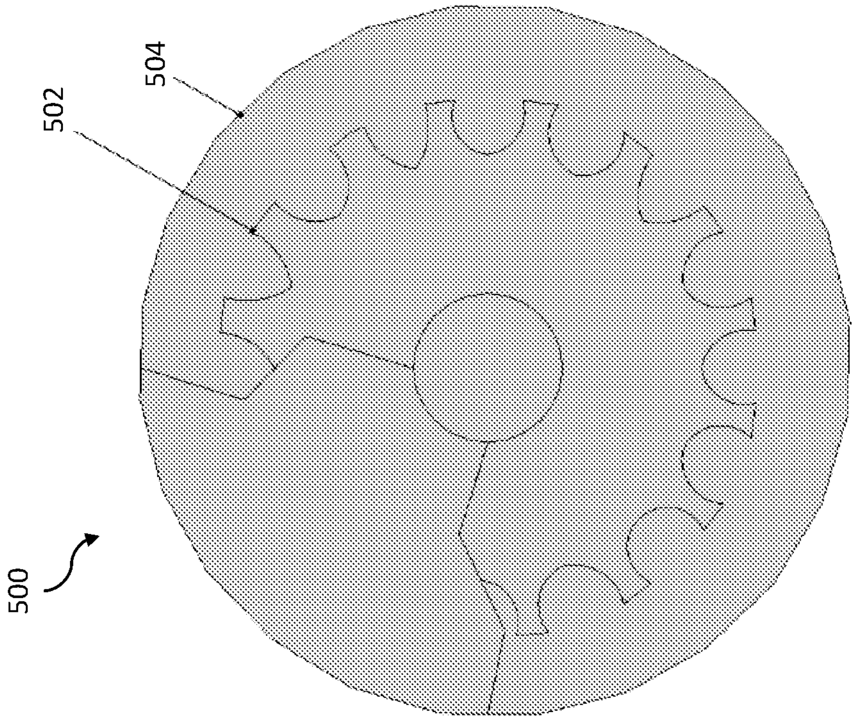

FIG. 5A illustrates a side view of an exemplary pulley 500 and FIG. 5B illustrates a front view of the exemplary pulley 500. In various embodiments, the pulley 500 may be configured to couple to a chain. In various embodiments, the pulley 500 may include one or more gears 502 configured to engage the chain. In various embodiments, the pulley 500 may include an outer wall 504 on one or both sides configured to contain the chain and prevent the chain from slipping out.

Figure 6:
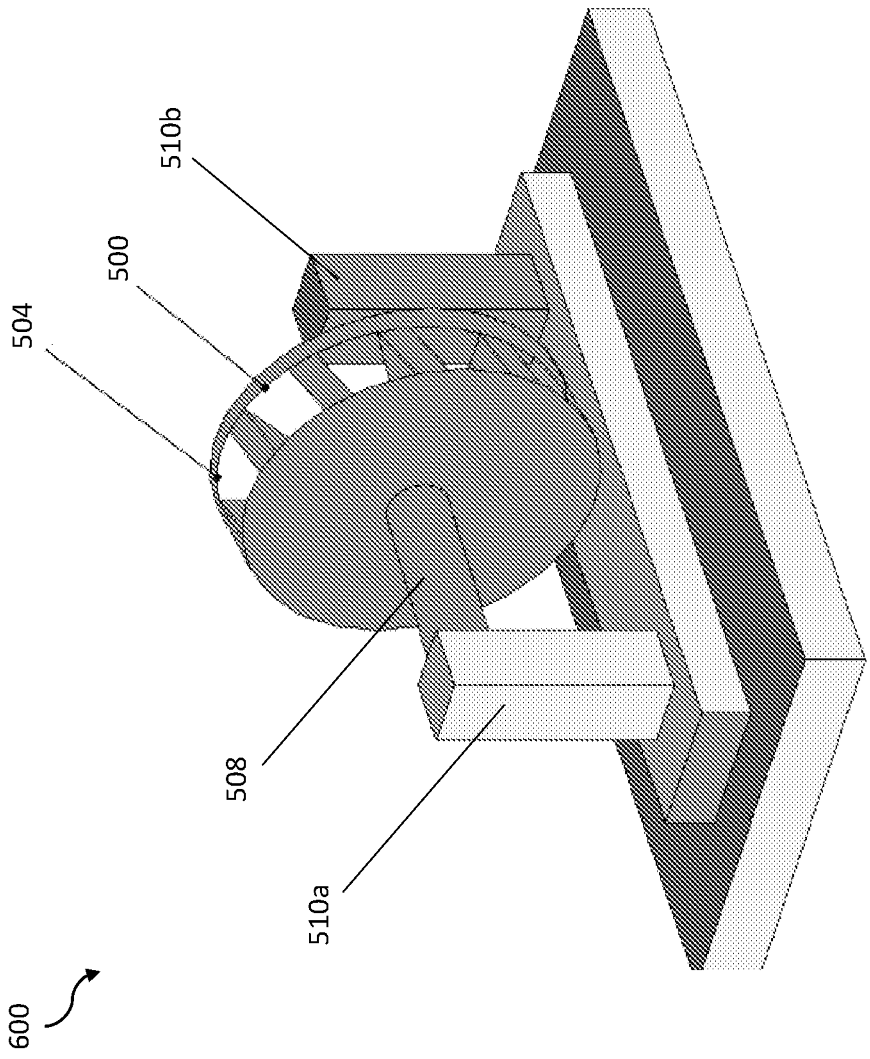
FIG. 6 illustrates a pulley assembly in accordance with an embodiment of the present disclosure.

FIG. 6 illustrates a pulley assembly 600. In various embodiments, the pulley assembly 600 includes a pulley 500 as described above affixed to posts 510*a*, 510*b* via an axle 508. The pulley 500 is configured to rotate about a longitudinal axis defined by the axle 508 as the chain moves the wiper arm up or down.

Figure 7:
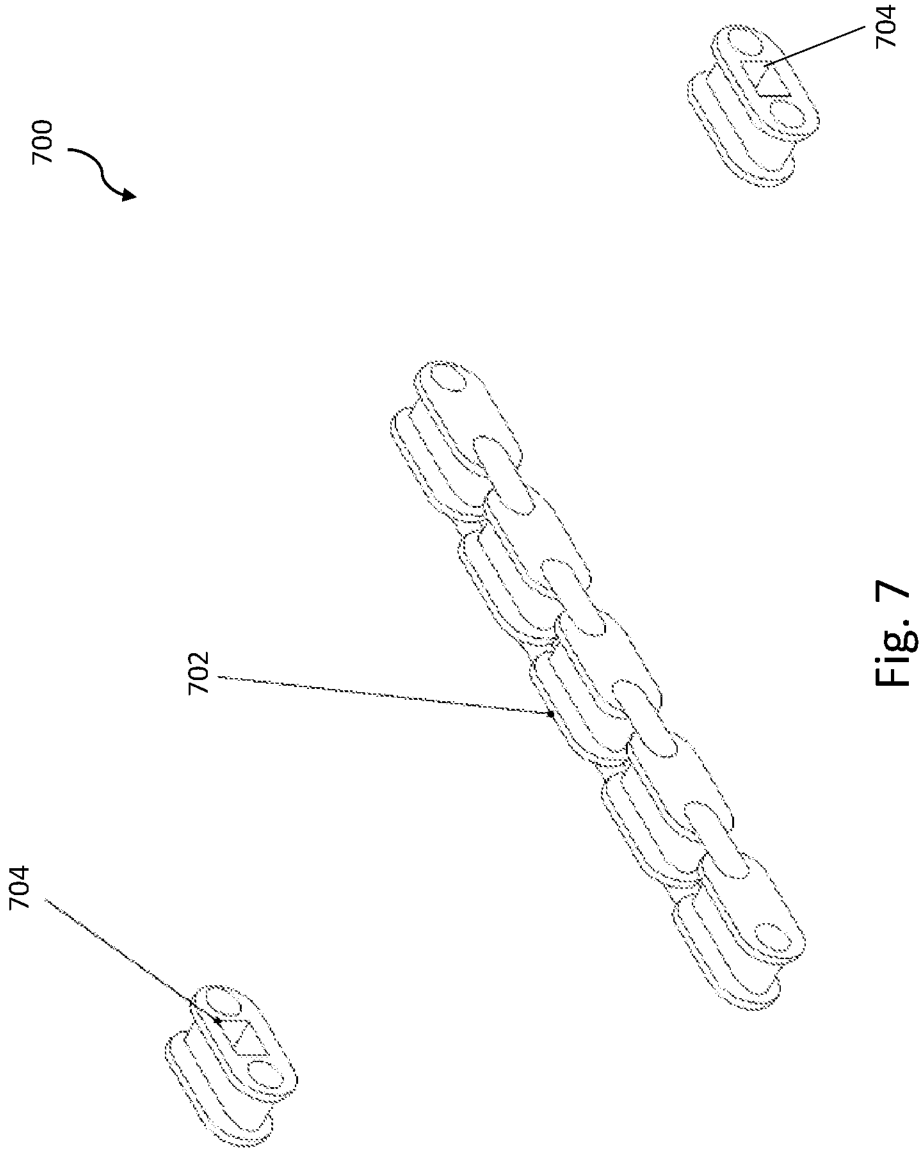
FIG. 7 illustrates a chain for a pulley in accordance with an embodiment of the present disclosure.

FIG. 7 illustrates a chain 700 for a pulley, such as the pulley 500 of FIGS. 5A-5B and 6. In various embodiments, the chain 700 includes removable links 702 coupled to one another in series. In various embodiments, each of the two chains (one chain per two sides of window frame) includes at least one link having a receiver hole 704 for an end of the wiper arm. In various embodiments, the wiper arm may be inserted into the receiver hole 704. In various embodiments, the receiver hole 704 may include a taper, where the side facing towards the window pane is larger in size than the side facing away from the window pane, thereby restricting motion of the wiper arm after insertion into each receiver hole 704.

Figure 8:
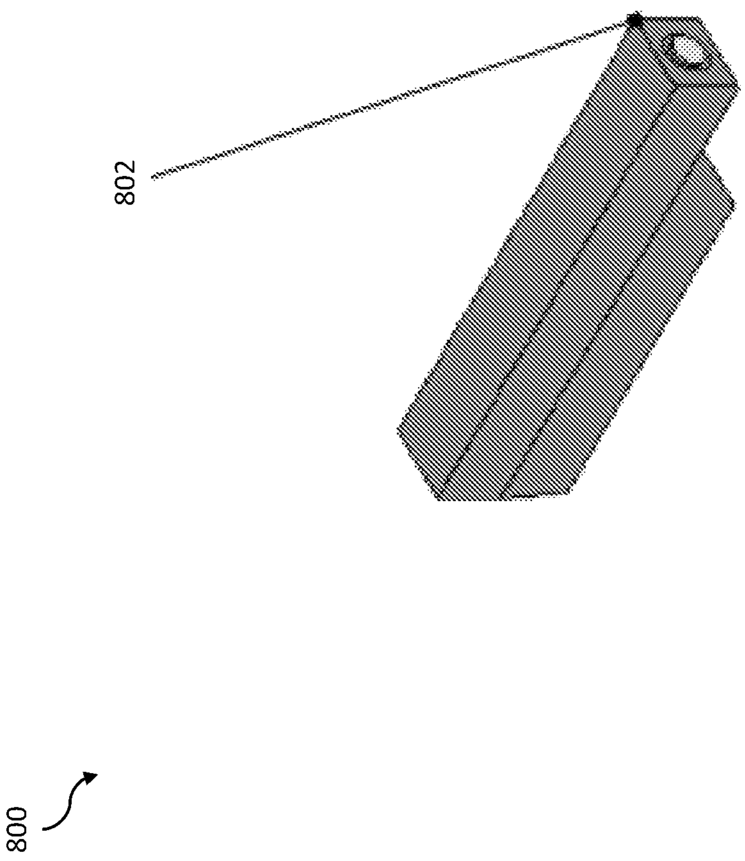
FIG. 8 illustrates an end of a wiper arm in accordance with an embodiment of the present disclosure.

FIG. 8 illustrates an end of a wiper arm 810. As shown in FIG. 8, the wiper arm 800 may include a connection fitting 802 for connecting a hose for supplying cleaning fluid. In various embodiments, the connection fitting 802 may include any suitable fitting, such as, for example, a one way valve. When coupled to the hose, the connection fitting 802 may allow cleaning fluid to flow only in one direction when pumped—to the spray nozzles of the wiper arm.

Figure 9A:
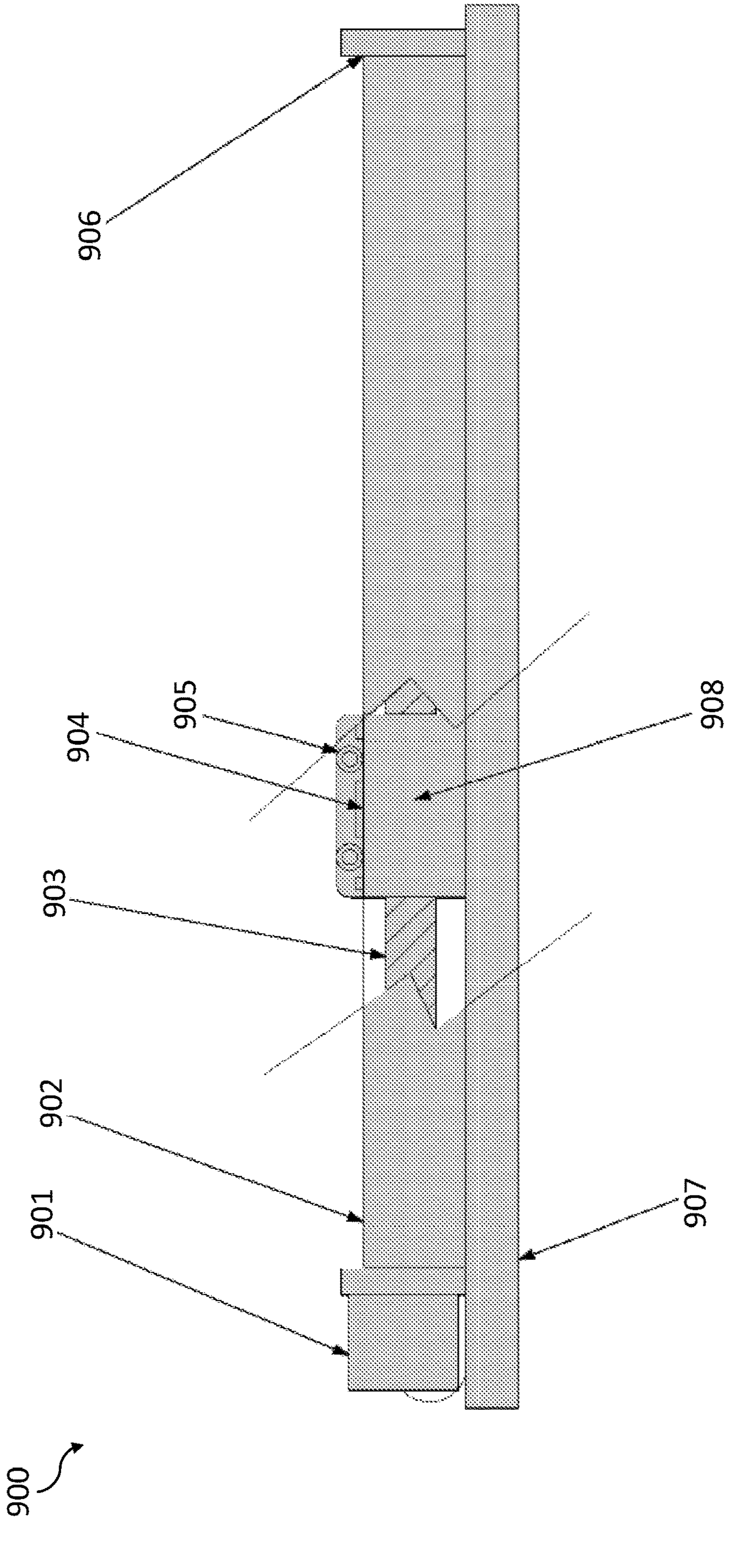
FIG. 9A-B illustrates side views of a screw drive in accordance with an embodiment of the present disclosure.
Figure 9B:
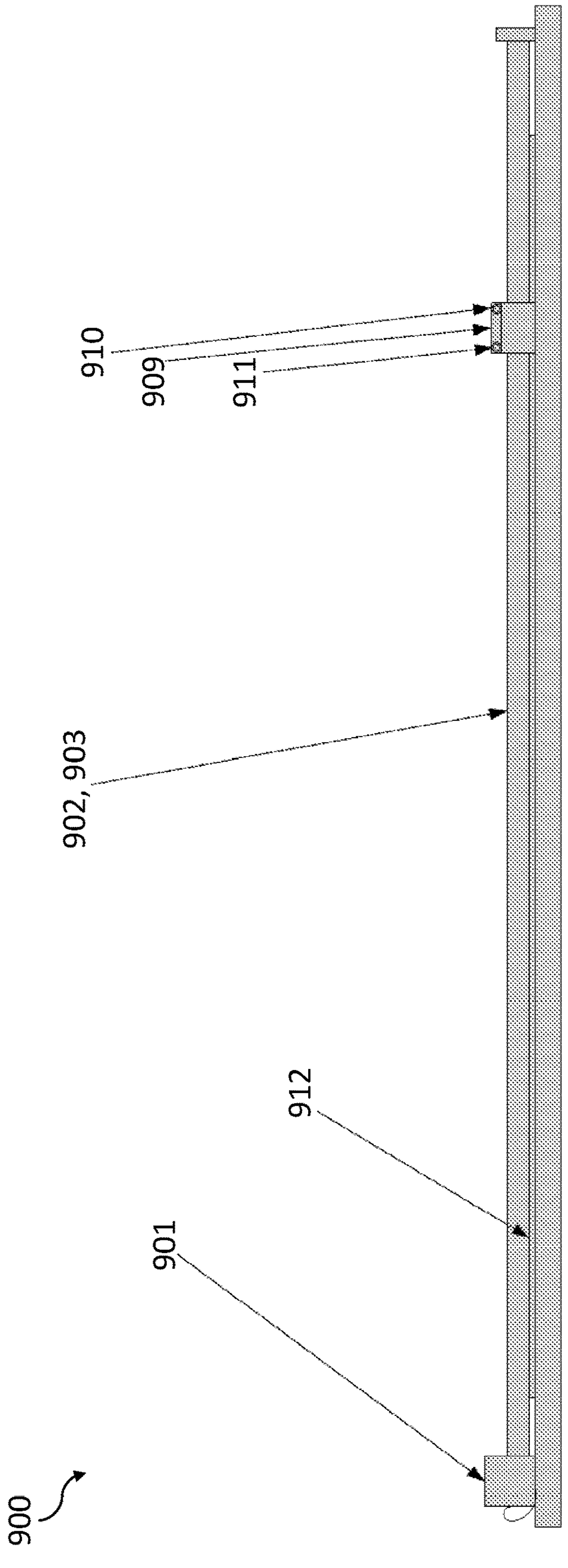

Referring now to FIG. 9A FIGS. 9A and 9B illustrate a side view of a window having an integrated window washing assembly 900. As shown in FIGS. 9A-9B, the window washing assembly 900 includes a motor 901. Motor 901 may affixed to a window such as an interior window 907 by a screw drive end bearing 906. In various embodiments, the window washing assembly 900 may include any suitable mechanism that converts rotational motion from a motor into linear motion capable of translating a washer arm 909. In various embodiments, each end of the washer arm 909 may be coupled to a linear screw actuator (also called a linear slide), such as a screw drive 903. In various embodiments, a screw (e.g., acme screw) of the linear slide may receive the rotation from the motor 901 and convert the rotational motion into translational motion where the washer arm 909 is coupled to a traveler 908 of the screw drive 903. In various embodiments, the washer arm 909 may be coupled to one or more screw drives 903. In various embodiments, a motor 901 may be operably coupled to at least one screw drives 903.

Figure 9C:
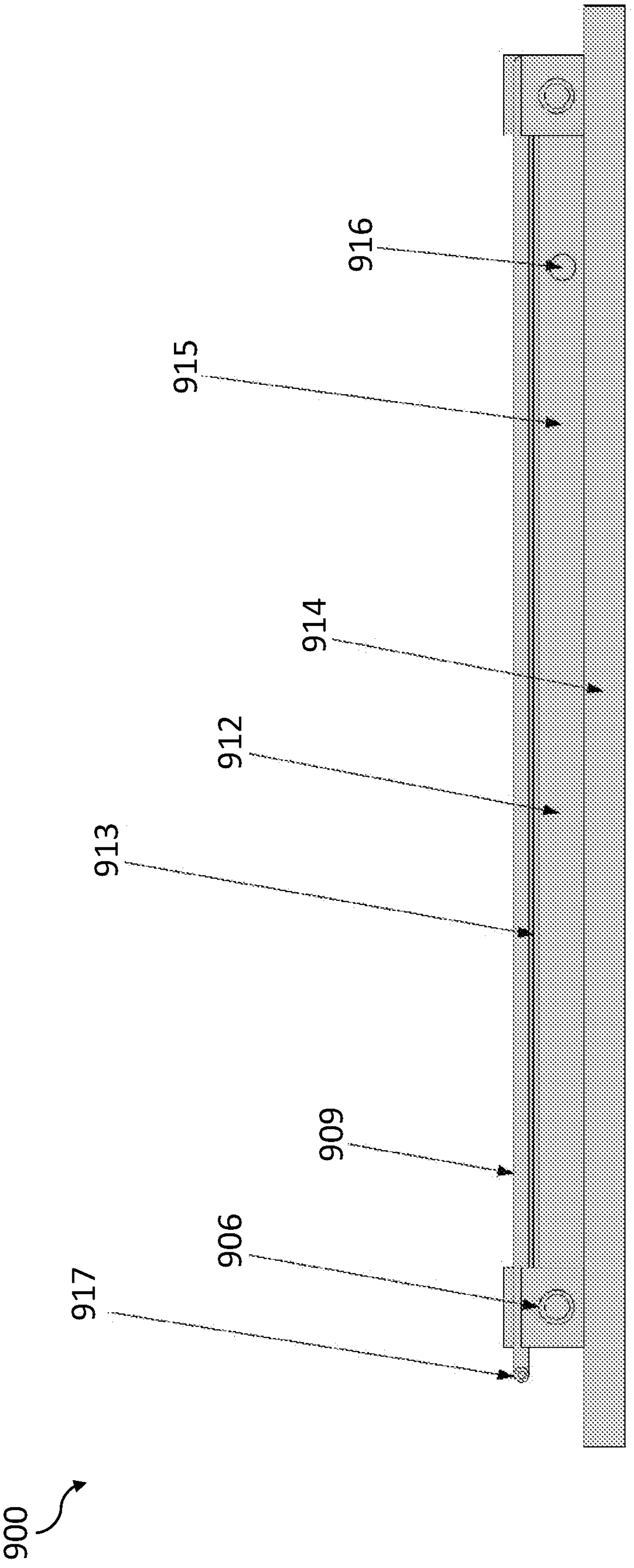
FIG. 9C illustrates a bottom view of a screw drive window washing assembly in accordance with an embodiment of the present disclosure.
Figure 9D:
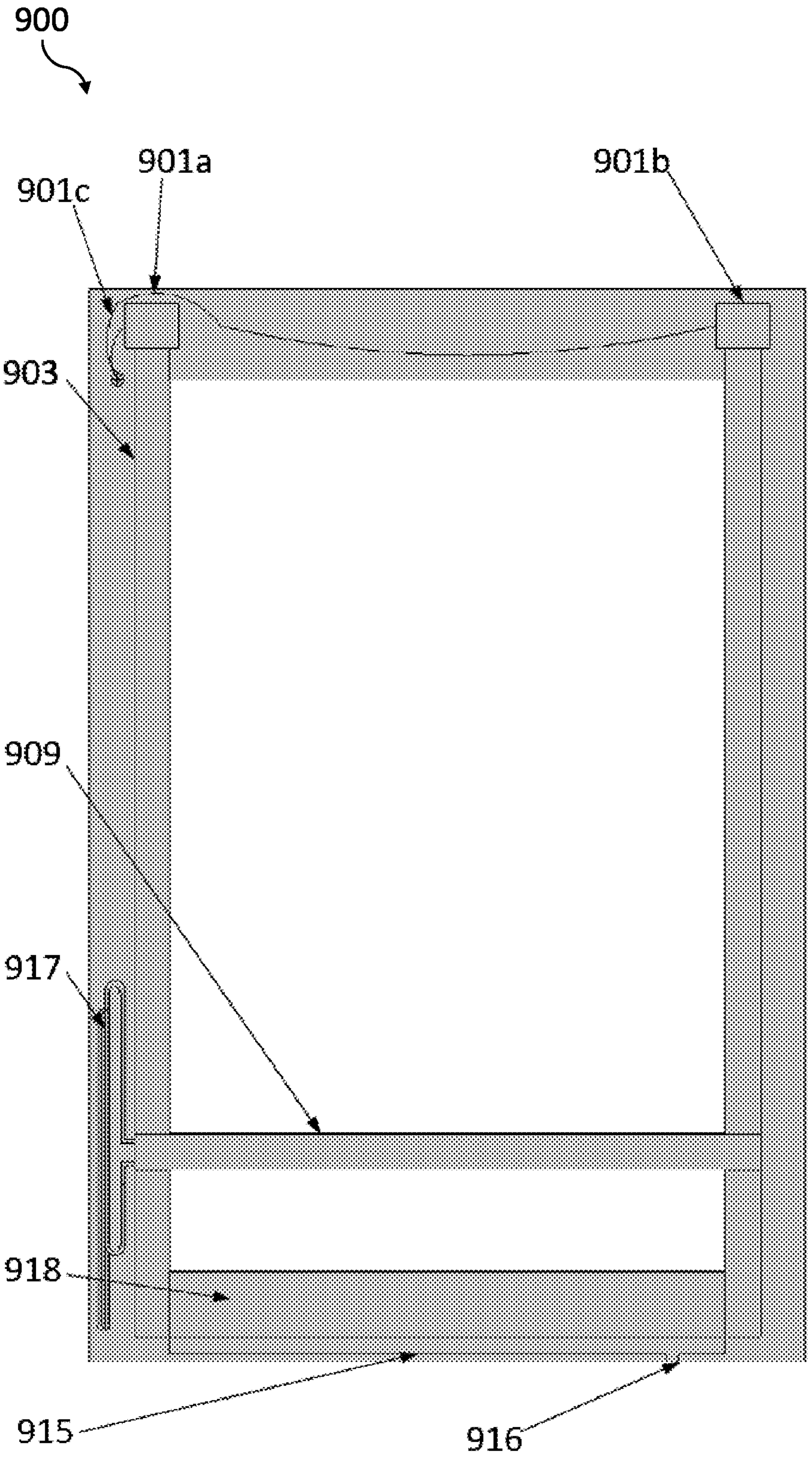
FIG. 9D illustrates a front view of a screw drive window washing assembly in accordance with an embodiment of the present disclosure.

As shown in FIGS. 9A-9C, the motor 901 is operably coupled to the screw drive 903 and is configured to drive the traveler 908 to thereby translate the washer arm 909 up and down the interior window 907 and specifically glass unit 912. In various embodiments, traveler 908 may be covered by the weather shield protector 902. In various embodiments, traveler 908 may be disposed outside of and configured to move over, through, around, or within the weather shield protector 902. In various embodiments, the motor 901 may be a stepper motor. In various embodiments, the motor 901 may be a brushless motor. In various embodiments, the motor 901 may be a DC motor. In various embodiments, the motor 901 may be an AC motor. In various embodiments, the motor 901 may be electrically coupled to a controller consistent with the description of a controller herein, configured to provide control signals to the motor 901 via control wires 901*c*. The control wires connecting controller to a first and second stepper motor 901*a*, 901*b* may carry electrical signals in order to control the first and second stepper motor 901*a*, 901*b*. In various embodiments, the controller may receive power (e.g., 120V AC, 12V DC, 3V DC, etc.) via a power cable from a power source (e.g., a 120V AC electrical outlet). In various embodiments, the motor 901 may be reversible in direction of rotation (e.g., by inverting the polarity of the applied voltage in a DC motor). In various embodiments, the motor 901 and/or screw drive 903 may be coupled to the window frame via one or more bearing 906 (e.g., ball bearing, fluid bearing, magnetic bearing, etc.). As shown in FIGS. 9D, the washer arm 909 translates up and down (and/or down and up) along the window pane.

In various embodiments, each screw drive 903 may be positioned within a containment track that is built into the window, thereby hiding the screw draft 903 within the window frame. In various embodiments, the wiper arm may engage (e.g., contact) the window pane through a portion of the traveler 908 cycle and not engage the window pane on another portion of the traveler 908 cycle. In various embodiments, the connecting hose may include a joint configured to revolve 360 degrees (e.g., a rotary or swivel joint). In various embodiments, a stop sensor may be positioned along the path of the wiper blade to provide a signal to the control unit that stops the motor. In various embodiments, a tensioning device may be coupled to the screw drive 903 and activate on the one part of the cycle (e.g., upward cycle) and push the wiper arm assembly off of the glass (e.g., as the wiper arm travels upwards). In various embodiments, screw drive 903 is sealed from the elements by a weather shield protector 902. Weather shield protector 902 may be a series of walls arranged to cover at least one side of the screw drive 903, such as the lateral sides of screw drive 903 (left and right). The weather shield protector 902 may be configured to cover the whole of a screw drive 903 and allow the traveler 908 to pass up and down within the weather shield protector 902. For example, bristles may be configured to cover a side of the screw drive 903 and seal against water ingress, but allow the traveler 908 to pass through and push the bristle aside as it passes.

In various embodiments, the washer arm 909 includes one or more magnets 904. In various embodiments, the one or more magnets 904 may be positioned at a center of the traveler 908. In various embodiments, the one or more magnets 904 may be positioned in any suitable location along the length of the washer arm 909 or traveler 908 such that the one or more magnets 904 can engage a corresponding magnetic stop at any suitable edge of the window pane (the distance therebetween defining a linear travel distance of the washer arm 909). In various embodiments, any magnetic stop may be electrically coupled to the controller to thereby provide a control signal to the controller for stopping and/or reversing the direction of the washer arm 909. In various embodiments, the one or more nozzles may include a first subset of nozzles positioned on one side (e.g., left side) of the one or more magnets 904 and a second subset of nozzles on the other side (e.g., right side) of the one or more magnets 904. In general, locating the spray nozzles on the wiper arm may deliver the best results as the entire window surface can be coated during the cleaning process. Spraying from the top only may cause streaks as the wiper arm would lose solution the further it travels. In various embodiments, spraying from the side may also be suitable as long as side nozzles are configured (e.g., adjusted to spray at different angles) to cover the entire window.

In various embodiments, a protrusion may be provided on the washer arm 909 such that the protrusion activates a switch (e.g., a button) or completes a circuit (e.g., via contact between two metal ends) to provide a signal to a controller via control wires 901*c* and thereby stop the linear travel of the washer arm 909 and/or reverse the linear direction of travel of the washer arm 909. In various embodiments, an infrared distance sensor may be used to determine when the wiper arm is nearing the edge of the interior window 907 to provide a control signal to the control unit and thereby stop and/or reverse the direction of travel of the washer arm 909. In various embodiments, the wiper arm may include one or more (e.g., two) stop points at which the wiper arm stops and reverses direction when contacted. In various embodiments, this may be achieved by programming in the central processing unit that counts revolutions of the pulley, a timed interval, and/or rotations of a motor. In various embodiments, an advantage of the magnetic stops is that stops can be used to adjust for changes in the cycle of the wiper arm. In various embodiments, if the wiper arm is out of calibration (e.g., translates too far or not enough), the system can correct itself by running through a cycle and finding the stop and start points denoted by the magnetic stops. In various embodiments, without a stop to define stopping points of the wiper arm, if the wiper arm were to lose calibration, the system may require manual service.

In various embodiments, to accommodate a hose to supply the nozzles with cleaning fluid, the washer arm 909 may include an integrated fitting configured to hold the wiper arm in place against the traveler 908 and allow attachment of the cleaning solution hose via a washer fluid supply 905. In various embodiments, where the washer arm 909 translates sideways (left-to-right or right-to-left, where the wiper arm extends from a top side of the window frame to a bottom side of the window frame), the hose that supplies the cleaning fluid may be coupled to the washer arm 909 at the top or another suitable side.

Referring specifically to FIG. 9B, traveler 908 may couple washer arm 909 to screw drive 903 (shown covered by weather shield protector 902). Traveler 908 may include washer arm down cycle feed 910 and washer arm up cycle feed 911. The down cycle feed 910 and up cycle feed 910 may be configured to intake and/or output washer fluid via one or more hoses. Down cycle feed 910 and/or up cycle feed 911 may be configured to each input or output washer fluid simultaneously, in turns, or oppositely.

Now referring specifically to FIG. 9C, a bottom view of the integrated window washing assembly 900 is illustrated. The bottom view of interior window 914 is shown as the relatively short bottom side of the window (relative to the orientation presented in FIG. 9D). The bottom end of screw drive 906 is shown on either terminus of interior window 914, the screw drive end 906 may be any bearing as described above and configured to bear the load of screw drive 903 as it turns and/or at rest. For example and without limitation, screw drive 903 may be configured to rotate in response to the motor, turning with screw drive end 906 freely, without translating relative to screw drive end 906. Assembly 900 may include excess washer fluid catch basin 915 disposed at the bottom edge of the window on which assembly 900 is affixed. Excess washer fluid catch basin 915 is configured to capture the fluid sprayed on the window which drips down due to gravity or is moved downward by washer arm 909 and/or wiper blades 913. The excess washer fluid catch basin 915 may include a catch basin drain 916, the drain configured to exhaust the excess fluid that is caught in the catch basin 915. For example and without limitation, the catch basin drain 916 may be fixed to a hose, conduit, or other component configured to transport liquid out of the catch basin 915. FIG. 9C also depicts washer fluid supply line 917, the supply line 917 configured to transport washer fluid to the washer arm 909 throughout its path along the window. The supply line 917 may be configured to attach to one or more ports such as wash fluid supply 905 disposed on the traveler 908, the supply line 917 being formed from flexible material in order to bend, twist, unravel, or otherwise change its shape depending on the location of the traveler 908 on screw drive 903. In various embodiments, the washer arm 909 includes one or more wiper blades 913 in contact with the exterior surface of the interior window 914. In various embodiments, the one or more wiper blades 913 are configured to translate in both directions along the surface of the interior window 914. The wiper blades can be replaceable (e.g., a removable squeegee/lip portion can be detached from the (permanent) wiper arm with an eye or J-hook similar to an automobile wiper blade). The washer arm 909 may also include wiper blades 913 consistent with the description of wiper blades herein above. Additionally, assembly 900 includes washer arm docking station 918. The washer arm docking station 918 may be disposed at the bottom edge of the window on which the assembly is affixed. The washer arm docking station 918 may be configured to store the washer arm 909 within itself, protecting the washer arm 909 from the elements when not in use. Washer arm docking station 918 may include one or more sensors configured to detect washer 909 presence, and in turn may send a control signal to one or more motors 901*a*, 901*b*, thereby stopping, reversing or otherwise accelerating said motors to translate the washer arm 909.

Now referring to FIG. 9D, assembly 900 is shown in a front view. As shown in FIG. 9D, there may be a first stepper motor 901*a* and a second stepper motor 901*b*, the first and second stepper motors affixed to the ends of a first and/or second screw drives 903, the first and second screw drive disposed parallel to one another on parallel portions of the window frame. The first and second motors 901*a*, 901*b* may be electrically connected to one or more controllers via control wires 901*c*. Control wires 901*c* may be configured to transmit one or more electrical signals and/or complete a circuit which is configured to reverse, stop, or otherwise accelerate at least one of the motors 901*a*, 901*b*.

Figure 10:
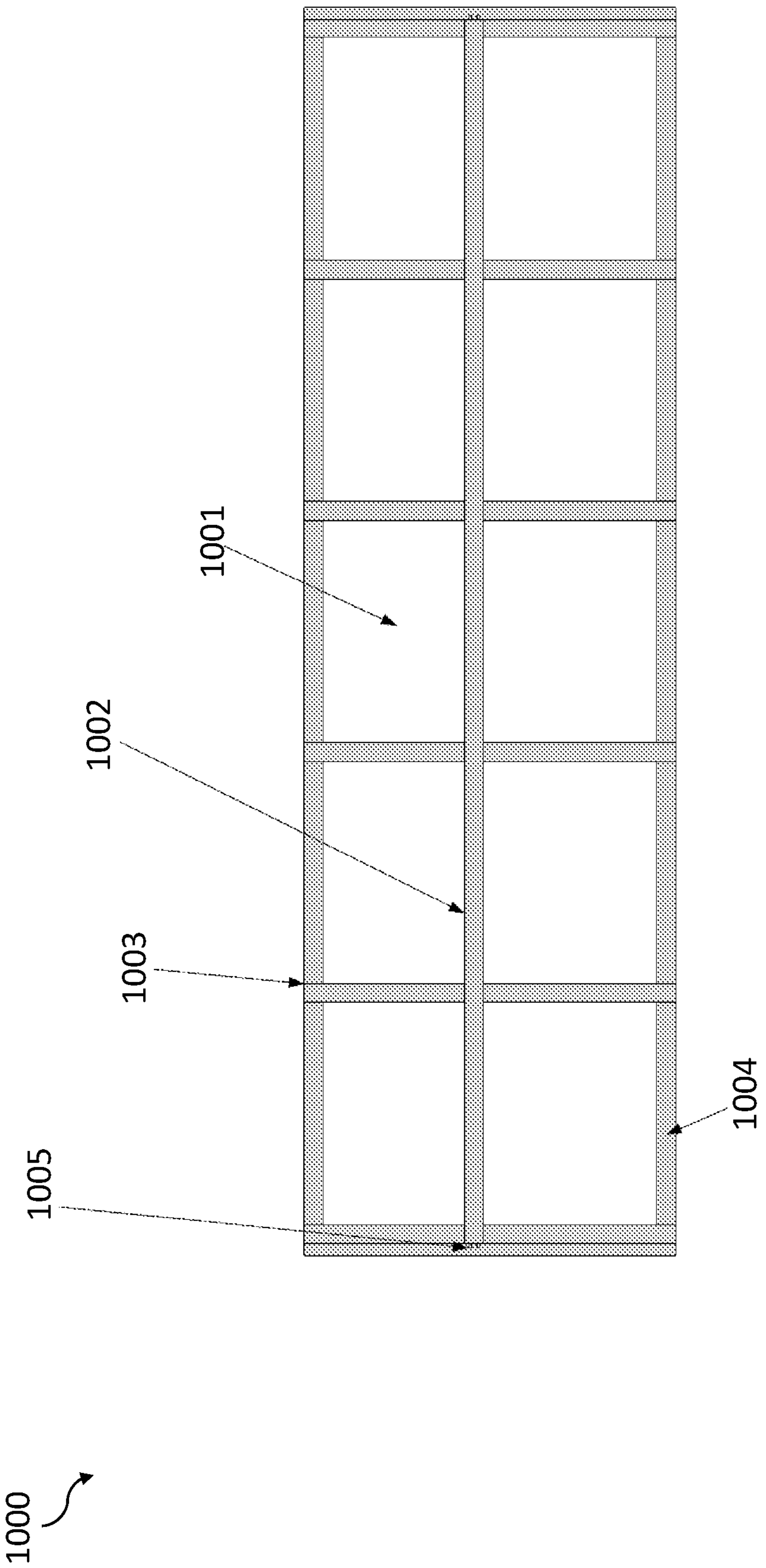
FIG. 10 illustrates a commercial window system including a plurality of panes in accordance with an embodiment of the present disclosure.

Referring now to FIG. 10, a commercial window 1000 utilizing the disclosed system is shown in front view. Commercial window 1000 may include a plurality of window panes 1001 consistent with the description of windows and window panes as disclosed herein. Commercial window 1000 may have an arrangement of panes disposed in one row as depicted in FIG. 10. Commercial window 1000 may have an arrangement of panes disposed in a grid, including at least two rows and at least two columns. Commercial window 1000 may have an arrangement of panes including one column of panes arranged vertically. Commercial window system 1000 may include a continuous washer arm 1002, the continuous washer arm 1002 spanning at least two windows in a row, or all of the windows in a row, according to embodiments. In various embodiments, continuous washer arm 1002 may be disposed vertically and travel horizontally across the panes 1001. One of skill in the art would appreciate that the arrangement of the panes 1001 may inform the arrangement and movement path of continuous washer arm 1002. Continuous washer arm 1002 may be consistent with any washer arm as described herein, configured to travel across at least one pane 1001, spraying and wiping fluid off of said panes to clean.

Continuous washer arm 1002 may be configured to travel up and down the pane 1001 via screw drive 1003. Screw drive 1003 may be encased as described herein (and as shown in FIG. 10) hidden within the frame of the window. For example, screw drive 1003 may be disposed between window panes 1001, hidden in the vertical portions of the frame. Screw drive 1003 may be similar or the same as any screw drive as described herein. Continuous washer arm 1002 may be connected to said screw drive 1003 via a traveler, or a component that is configured to translate along a linear path via a turning screw of the screw drive 1003. The continuous washer arm 1002 may be attached to one or more screw drives 1003, such as two, three, four, five, six or more screw drives 1003. The continuous washer arm 1002 may be attached at regular intervals along its span to said screw drives 1003 or at asymmetrical points along said span.

Still referring to FIG. 10, commercial window system 1000 may include a washer arm docking station 1004. The docking station 1004 may be configured to support the continuous washer arm 1002 when not in use, as well as protect said washer arm 1002 from the elements between washing cycles or during the portion of the cycle wherein the washing arm 1002 is within or near said docking station 1004.

With continued reference to FIG. 10, commercial window system 1000 may include washer fluid supply lines 1005. Washer fluid supply lines 1005, the supply line 1005 configured to transport washer fluid to the washer arm 1002 throughout its path along the window. The supply line 1005 may be configured to attach to one or more ports such as wash fluid supply 1005 disposed on the traveler, the supply line 1005 being formed from flexible material in order to bend, twist, unravel, or otherwise change its shape depending on the location of the traveler on screw drive 1003. Supply lines 1005 may be coupled to one or more ports on the washer arm 1002 along its span. Supply lines 1005 may be coupled to one or more ports on the washer arm such as on one or more travelers along the one or more screw drives 1003 on which washer arm 1002 translates over the panes 1001.

Figure 11:
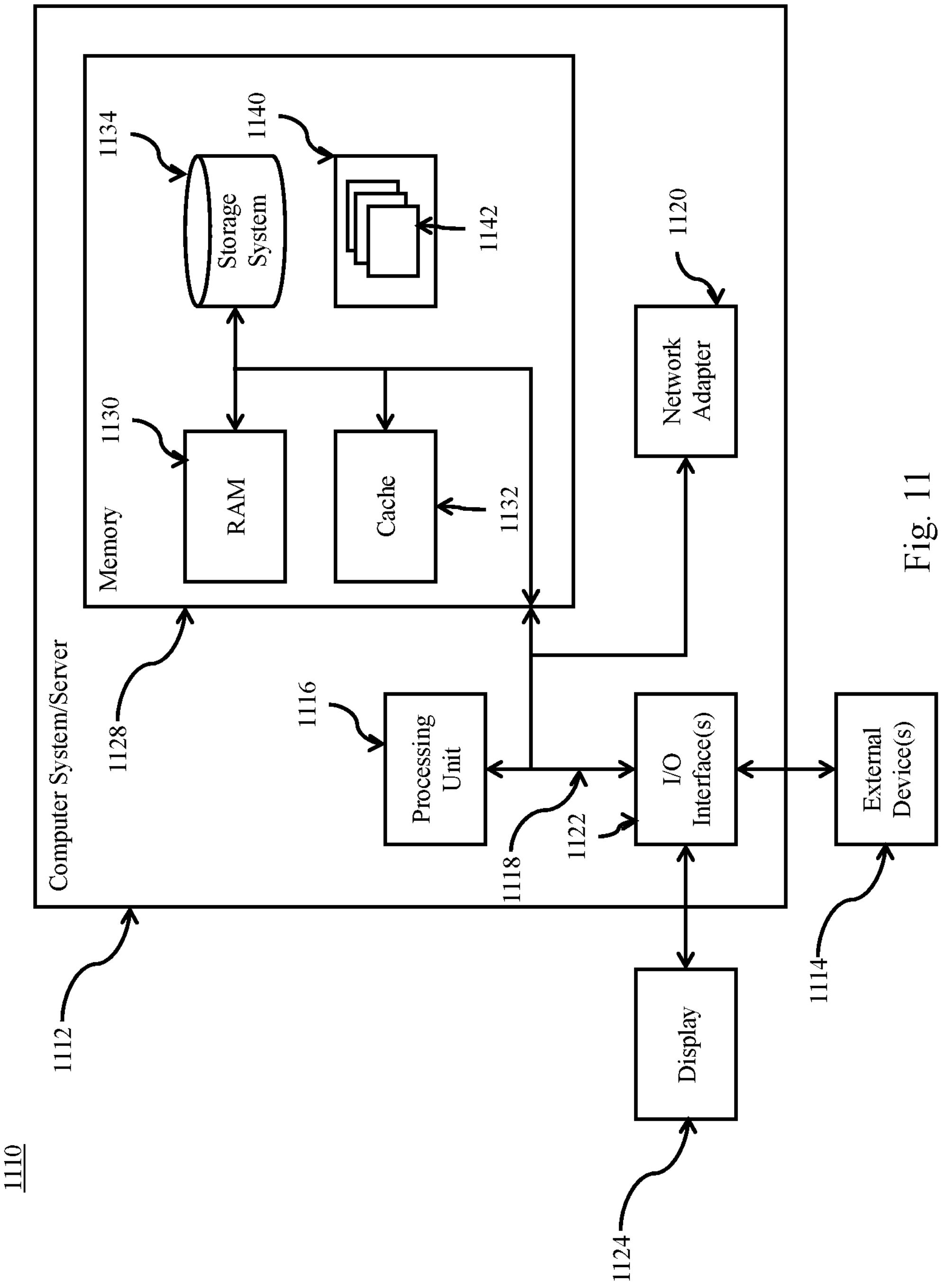
FIG. 11 depicts a computing node according to an embodiment of the present invention.

Referring now to FIG. 11, a schematic of an example of a computing node is shown. Computing node 1110 is only one example of a suitable computing node and is not intended to suggest any limitation as to the scope of use or functionality of embodiments of the invention described herein. Regardless, computing node 1110 is capable of being implemented and/or performing any of the functionality set forth hereinabove. This hardware allows for remote control of the various operations described above, as well as for programming of the window cleaning operation such that a cleaning regiment can be created (e.g. periodic maintenance and/or on demand performance).

In computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A window washing assembly comprising:
- a first screw drive disposed within a first side of a frame, the frame comprising a window frame surrounding a window pane;
- a second screw drive disposed within a second side of the frame, the second side disposed opposite the first side;
- a wiper arm extending from a first end to a second end and having a length therebetween, the first end operatively engaged with the first screw drive and the second end operatively engaged with the second screw drive, the wiper arm comprising:
  - a wiper blade,
  - one or more spray nozzles disposed on and along the length of the wiper arm, and
  - one or more magnets disposed on the wiper arm;
- a motor operatively coupled to at least one of the first screw drive or the second screw, the motor configured, upon activation, to rotate the first screw drive and second screw drive and thereby cause translational motion of the wiper arm;
- a cleaning fluid reservoir;
- a supply line fluidly coupling the cleaning fluid reservoir to the one or more spray nozzles of the wiper arm, the supply line disposed along the first side of the frame and routed toward the wiper arm to deliver a cleaning fluid to the one or more spray nozzles;
- a first magnetic stop disposed proximate a third side of the frame;
- a second magnetic stop disposed proximate a fourth side of the frame, the fourth side disposed opposite the third side, and the third side and the fourth side extending between the first side and the second side of the frame;
- wherein a distance between the first magnetic stop and the second magnetic stop defines a translation distance of the wiper arm; and
- wherein contact between at least one magnet of the wiper arm and one of the magnetic stops causes the motor to stop or reverse translation of the wiper arm.

2. The window washing assembly of claim 1, wherein the wiper blade is configured to be in contact with the window pane.

3. The window washing assembly of claim 1, further comprising a wiper arm docking station configured to receive and store the wiper arm.

4. The window washing assembly of claim 3, wherein the wiper arm docking station comprises one or more sensors configured to detect the wiper arm.

5. The window washing assembly of claim 3, wherein the wiper arm docking station is disposed between the first side and second side of the frame.

6. The window washing assembly of claim 1, wherein the third side is adjacent to the first side and the second side.

7. The window washing assembly of claim 1, wherein the one or more magnets comprise a magnet disposed at a center of the wiper arm.

8. The window washing assembly of claim 7, wherein a first subset of the one or more spray nozzles is disposed on a first side of the magnet and a second subset of the one or more spray nozzles is disposed on a second side of the magnet.

9. The window washing assembly of claim 1, wherein the supply line comprises a flexible material.

10. The window washing assembly of claim 1, wherein the one or more spray nozzles spray a cleaning fluid during the translational motion of the wiper arm.

11. The window washing assembly of claim 10, further comprising a fluid catch basin disposed at the fourth side of the frame and configured to capture sprayed cleaning fluid.

12. The window washing assembly of claim 1, further comprising a pump configured to flow fluid from the cleaning fluid reservoir to the one or more spray nozzles.

13. The window washing assembly of claim 12, further comprising a controller, the controller operatively coupled to the motor and the pump, the controller configured to selectively activate the pump and the motor.

14. The window washing assembly of claim 13, wherein the controller is configured to receive user-programmed instructions to schedule activation of the motor and the pump at a predetermined time.

15. The window washing assembly of claim 13, further comprising a cleaning fluid relay operatively coupled to the controller, the cleaning fluid relay configured to track a fluid level in the cleaning fluid reservoir.

16. A method of washing an exterior of a window having a window frame surrounding a window pane, the method comprising:
- providing the window washing assembly of claim 1;
- actuating the motor, thereby causing the motor to rotate the first screw drive and second screw drive such that the wiper arm translates along the window pane between the third and fourth side of the frame; and
- providing cleaning fluid to the one or more spray nozzles;
- wherein contact between at least one magnet of the wiper arm and one of the magnetic stops, causes the motor to reverse rotation, thereby reversing translation of the wiper arm, and thereby wiping the cleaning fluid from the surface of the window pane with the wiper blade.

17. The method of claim 16, wherein contact between at least one magnet of the wiper arm and one of the magnetic stops, causes the motor to stop rotation, thereby stopping translation of the wiper arm.

* * * * *